US010136320B1

(12) United States Patent
Sugawara et al.

(10) Patent No.: US 10,136,320 B1
(45) Date of Patent: Nov. 20, 2018

(54) AUTHENTICATION OF USERS AT MULTIPLE TERMINALS

(71) Applicant: International Business Machines Corporation, Armonk, NY (US)

(72) Inventors: Masaya M. Sugawara, Tokyo (JP); Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/821,036

(22) Filed: Nov. 22, 2017

(51) Int. Cl.
*G06F 21/00* (2013.01)
*H04W 88/02* (2009.01)
*H04W 12/06* (2009.01)
*H04L 29/06* (2006.01)
*G06F 21/31* (2013.01)
*H04W 12/08* (2009.01)
*G06F 21/32* (2013.01)

(52) U.S. Cl.
CPC .......... *H04W 12/06* (2013.01); *G06F 21/316* (2013.01); *G06F 21/32* (2013.01); *H04L 63/0861* (2013.01); *H04L 63/104* (2013.01); *H04W 12/08* (2013.01); *H04W 88/02* (2013.01)

(58) Field of Classification Search
CPC ..... H04W 12/06; H04W 12/08; H04W 88/02; G06F 21/316; G06F 21/32; G06F 21/45; G06F 12/0891; G06F 2212/60; G06F 21/00; H04L 63/0861; H04L 63/104
USPC ......................................................... 455/411
See application file for complete search history.

(56) References Cited

U.S. PATENT DOCUMENTS

| 2015/0178581 | A1* | 6/2015 | Aoki | G06K 9/00926 382/115 |
| --- | --- | --- | --- | --- |
| 2016/0197917 | A1* | 7/2016 | Lee | H04W 4/80 726/7 |
| 2016/0359864 | A1* | 12/2016 | Dhaliwal | H04L 63/102 |
| 2017/0076164 | A1* | 3/2017 | Abe | G06K 9/00892 |
| 2017/0222809 | A1* | 8/2017 | Takahashi | H04L 9/3231 |
| 2017/0262719 | A1* | 9/2017 | Yamazaki | G06F 21/32 |
| 2017/0308694 | A1* | 10/2017 | Belavadi | G06F 21/45 |
| 2017/0324735 | A1* | 11/2017 | Wolf | G06F 21/31 |
| 2017/0330028 | A1* | 11/2017 | Lo | G06K 9/00288 |
| 2018/0020349 | A1* | 1/2018 | Tyagi | H04W 12/06 |
| 2018/0052987 | A1* | 2/2018 | Tada | G06F 21/41 |
| 2018/0060547 | A1* | 3/2018 | Holz | G06F 21/6245 |
| 2018/0107885 | A1* | 4/2018 | Jo | G06K 9/00892 |

FOREIGN PATENT DOCUMENTS

| EP | 2192547 A1 | 6/2010 |
| --- | --- | --- |
| JP | 2008009753 A | 1/2008 |
| JP | 2008021071 A | 1/2008 |

(Continued)

*Primary Examiner* — Khawar Iqbal
(74) *Attorney, Agent, or Firm* — Brown & Michaels, PC; David Woycechowsky

(57) ABSTRACT

An authentication system which uses an authentication priority list based on dynamic and virtual grouping of terminals used for authentication, resulting in an efficiency improvement of authentication priority sequence in 1:N type authentication, and hybrid authentication by switching authentication logic between 1:1 and 1:N authentication. Masking of pre-logged-in users for the authentication priority list in 1:N authentication improves the efficiency of the authentication priority sequence in 1:N type authentication.

21 Claims, 7 Drawing Sheets

(56) References Cited

FOREIGN PATENT DOCUMENTS

| | | |
|---|---|---|
| JP | 2009151711 A | 7/2009 |
| JP | 2009288936 A | 12/2009 |
| JP | 2010026959 A | 2/2010 |
| JP | 2010152706 A | 7/2010 |
| JP | 2010170439 A | 8/2010 |
| JP | 2010191573 A | 9/2010 |
| JP | 2011154415 A | 8/2011 |
| JP | 2011242957 A | 12/2011 |
| JP | 2012008821 A | 1/2012 |
| JP | 2012027657 A | 2/2012 |
| JP | 2012133603 A | 7/2012 |
| JP | 2012248000 A | 12/2012 |
| JP | 2013029946 A | 2/2013 |
| JP | 2014099024 A | 5/2014 |
| JP | 2015088040 A | 5/2015 |
| JP | 2015170101 A | 9/2015 |

* cited by examiner

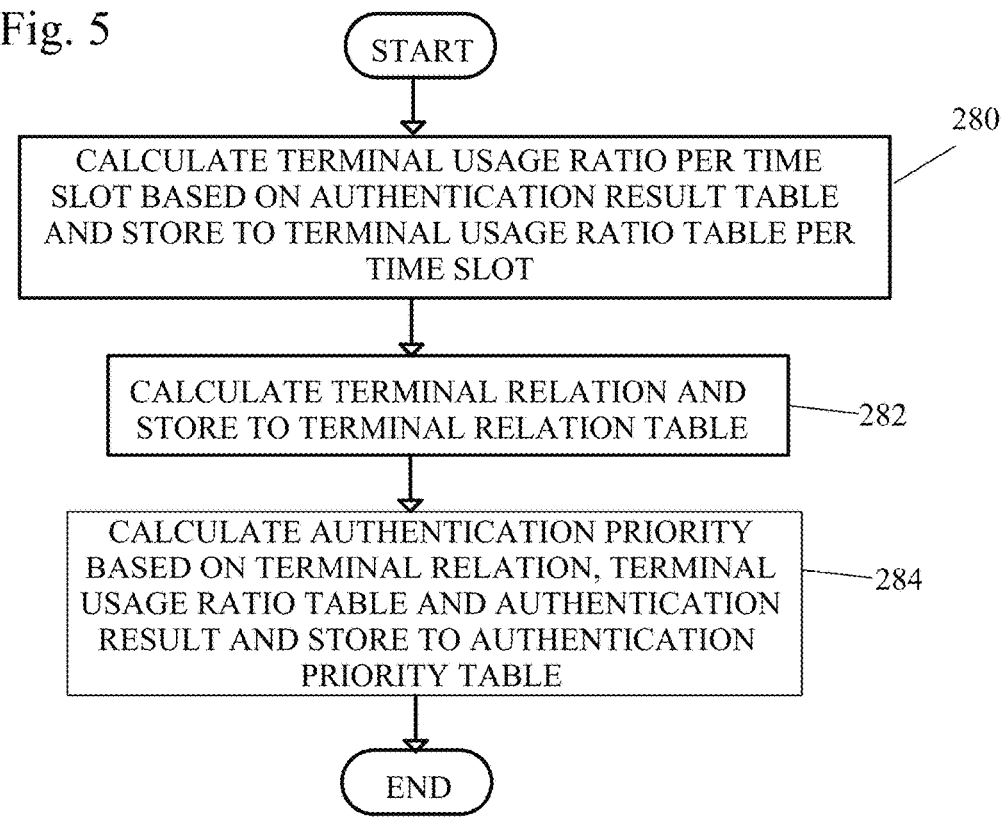

AUTHENTICATION OF USERS AT MULTIPLE TERMINALS

BACKGROUND

The present invention is directed to an authentication system that dynamically optimizes system authentication processing based on biometric information in an IT system through drawing upon distribution of user usage of terminals, thereby achieving a performance improvement of the authentication processing.

Prior art authentication in IT systems based on biometric information typically involves replacing password-based authentication of the identity of a user such as a user ID with authentication based on some characteristic inherent to the user, such as fingerprints or retina patterns or other characteristics as is known to the art. These inherent characteristics are commonly called "biometrics". In this context, the authentication processing takes the form of so-called "1:1 authentication", in which biometric data of the user is compared at the time of an authentication process with registered data of the same, single user.

According to recent trends of increasing requirement of high level of security to the IT system, high accuracy authentication on biometric authentication is important.

However, these type of high accuracy authentication, biometric authentication require also system CPU power cost for operation and sometimes results in long authentication time. Because the biometric authentication requires comparison of input and the data between difference data, so the calculation load for such process is high and the authentication time is long.

In some environments, a single terminal might be used by many users in a shared manner. For example, cash registers at a supermarket or check-in terminals at an airport might be used by more than one cashier or airline clerk.

The identification of users in such a shared environment could be done by having each user sign out when they leave the terminal, and requiring each new user to sign in before they can use the terminal. If each user has to input their ID prior to the biometric authentication, this type of authentication is termed "1:1 type authentication". In this case, authentication would be done by matching between data specified, and result in a constant load transaction.

Requiring the users to log in and out frequently can be problematic in shared terminal environments, where cashiers or airline clerks or the like may swap in and out on a single terminal many times in an effort to keep customer lines moving. In this case, it is desirable not to have each user log on and log off, but rather to use a single common account to log in the terminal, rather than a single user, and then to use biometric authentication of each user as they begin to use the already logged-on terminal. The number of potential registered users for any terminal in such an environment might be in the hundreds, all using the single common account. Performing authentication of the users on the common account is termed "1:N type authentication", where one account has "N" potential users.

It will be appreciated from the very nature of authentication that relies on biometric data derived from the users, needs to be quickly performed if there is to be a performance improvement from just requiring the traditional user-id based log on and log off for each user. Moreover, this process has to be performed while the system is in a heavily loaded state compared with standard 1:1 authentication, which understandably and inevitably causes delays in the required processes.

Since this type of usage requires high-speed authentication, there is a need for high speed processing using biometric authentication.

Many existing schemes realize acceleration in 1:N authentication through various approaches. In the following explanations, existing inventions directed to 1:N authentication acceleration approaches are classified into those that have relevance to the present invention and those of little or no relevance to the present invention. These existing systems may fall into the following classes:

Acceleration based on authentication logic: Acceleration by parallel authentication processing to carry out multiple authentication processes, multi-stage authentication by creation of representative data, etc. The authentication acceleration in parallel processing is not intended for reducing the entire system load associated with authentication. Acceleration through representative data does not consider the uneven distribution of the user authentication processes and tasks. Whether or not the representative data can be created depends on variations found in the user biometric authentication.

Techniques related to biometric authentication data: Features associated with increasing accuracy of biometric authentication data and providing additional information for the primary purpose of improvement in the biometric authentication accuracy among multiple entities. The primary purpose is to improve the authentication accuracy at the time of performing 1:N authentication rather than authentication acceleration as such.

Reducing the range of data by means of unique information: Acceleration by reducing the range of authentication data by content of operational processes and tasks for each user using the service and terminal ID of the terminal used in the service. The scheme of acceleration and screening for each user using the service and on a per-terminal basis will not be satisfactory as an acceleration scheme because users will not consciously take into account the constraint of the very idea of unique terminals in an environment envisaged this time where common accounts are used on multiple shared terminals.

Optimization by similarity: Scores are calculated on the basis of the similarity in the obtained biometric information to achieve discontinuation and acceleration of authentication. Use of the similarity is a scheme of acceleration that depends on the biometric information held by the users, which is versatile but does not involve any effects significant in the context of this case.

Existing exemplary cases of schemes and the problems of the schemes of the respective existing inventions include the following:

Authentication acceleration through switching between 1:1 authentication and 1:N authentication: This method is directed to a scheme of acceleration by discrimination and switching between processes of 1:1 authentication and 1:N authentication. The existing acceleration scheme through switching between 1:1 and 1:N authentications is implemented under the determination condition to determine presence or absence of any input of an ID to be subjected to the authentication which is input by the user as the condition for using 1:1 authentication. In the environment for which acceleration should be achieved, it is assumed that accesses are made by users using the common account.

Acceleration through grouping: The acceleration approach through grouping is a scheme that realizes acceleration by performing grouping for numerous pieces of data subjected to the authentication and manages the priority in the order of authentication and the like. This approach can be characterized as follows:

A) To be used in reducing the range of data to be searched for in the subsequent rounds of authentication by simply creating a list of pieces of information whose authentication has been successful. This has a problem in the common-account, multiple user environment, where it is assumed that all users subjected to 1:N authentication perform the authentication on a daily basis, and simple successful authentication results cannot be used in screening for acceleration in the principle.

B) Carrying out predetermined grouping at the time of authentication registration. The target environment is an environment where further acceleration is required between or among grouped users. Accordingly, acceleration by sorting at the time of authentication registration is not satisfactory as acceleration in the target environment.

C) Scheme related to re-configuration of grouped data. This is a scheme associated with maintaining optimization of the configuration of the group data and does not make much contribution to an environment where the target groups are substantially fixed.

D) Scheme related to screening by characteristics data in grouping. Effective for significant variations in the features of biometric authentication data in face authentication and the like, but only involves limited effects in finger vein authentication and the like.

Promoting efficiency by grouping of authentication data of the same person in 1:N authentication. Contributes to increase in the authentication data of the same person but only involves limited effects in increasing the group data.

Approaches for acceleration by grouping and 1:N switching and other relevant approaches abound depending upon the problems the respective problems addressed by prior-art inventions.

However, these existing patent publications are often dependent upon the specific problems to which they are applied, and do not necessarily provide a versatile solution that covers all conceivable cases.

SUMMARY

According to one embodiment of the present invention, a method of authentication of users at multiple terminals is disclosed. The method comprising the steps of: a) a computer receiving user input to starting authentication on a target terminal comprising biometric input from the user; b) the computer determining whether the biometric input received from the user indicates a same user is starting authentication on the target terminal as last authenticated by the computer for the target terminal; c) if the user is the same user that was last authenticated by the computer for the target terminal, the computer executing 1:1 type authentication of the user; and d) if the user is not the same user that was last authenticated by the computer for the target terminal. The computer: i) retrieving entries from an authentication priority table for the target terminal at a current time slot; ii) reading an authentication status on terminals other than the target terminal based on an authentication results table; iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal; iv) executing 1:N type authentication of the user using the temporal authentication table; v) determining whether the 1:N type authentication is accepted; and vi) if the 1:N type authentication is accepted, the computer granting the user access to the target terminal and storing the authentication result in the authentication results table.

According to another embodiment of the present invention, a computer program product for authentication of users at multiple terminals is disclosed. The computer program product using a computer comprising at least one processor, one or more memories, one or more computer readable storage media. The computer program product comprising a computer readable storage medium having program instructions embodied therewith. The program instructions executable by the computer to perform a method comprising: a) receiving, by the computer, user input to starting authentication on a target terminal comprising biometric input from the user; b) determining, by the computer, whether the biometric input received from the user indicates a same user is starting authentication on the target terminal as last authenticated by the computer for the target terminal; c) if the user is the same user that was last authenticated by the computer for the target terminal, executing, by the computer, 1:1 type authentication of the user; d) if the user is not the same user that was last authenticated by the computer for the target terminal. The computer: i) retrieving entries from an authentication priority table for the target terminal at a current time slot; ii) reading an authentication status on terminals other than the target terminal based on an authentication results table; iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal; iv) executing 1:N type authentication of the user using the temporal authentication table; v) determining whether the 1:N type authentication is accepted; and vi) if the 1:N type authentication is accepted, the computer granting the user access to the target terminal and storing the authentication result in the authentication results table.

According to another embodiment of the present invention, a computer system for authentication of users at multiple terminals is disclosed. The computer system comprising a computer comprising at least one processor, one or more memories, one or more computer readable storage media having program instructions executable by the computer to perform the program instructions. The program instructions comprising: a) receiving, by the computer, user input to starting authentication on a target terminal comprising biometric input from the user; b) determining, by the computer, whether the biometric input received from the user indicates a same user is starting authentication on the target terminal as last authenticated by the computer for the target terminal; c) if the user is the same user that was last authenticated by the computer for the target terminal, executing, by the computer, 1:1 type authentication of the user; d) if the user is not the same user that was last authenticated by the computer for the target terminal. The computer: i) retrieving entries from an authentication priority table for the target terminal at a current time slot; ii) reading an authentication status on terminals other than the target terminal based on an authentication results table; iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal; iv) executing 1:N type authentication of the user using the temporal authentication table; v) determining whether the 1:N type authentication is accepted; and vi) if the 1:N type authentication is accepted, the computer granting the user access to the target terminal and storing the authentication result in the authentication results table.

BRIEF DESCRIPTION OF THE DRAWINGS

FIG. 5 shows a flowchart of maintenance of authentication results.

DETAILED DESCRIPTION

Figure 1:
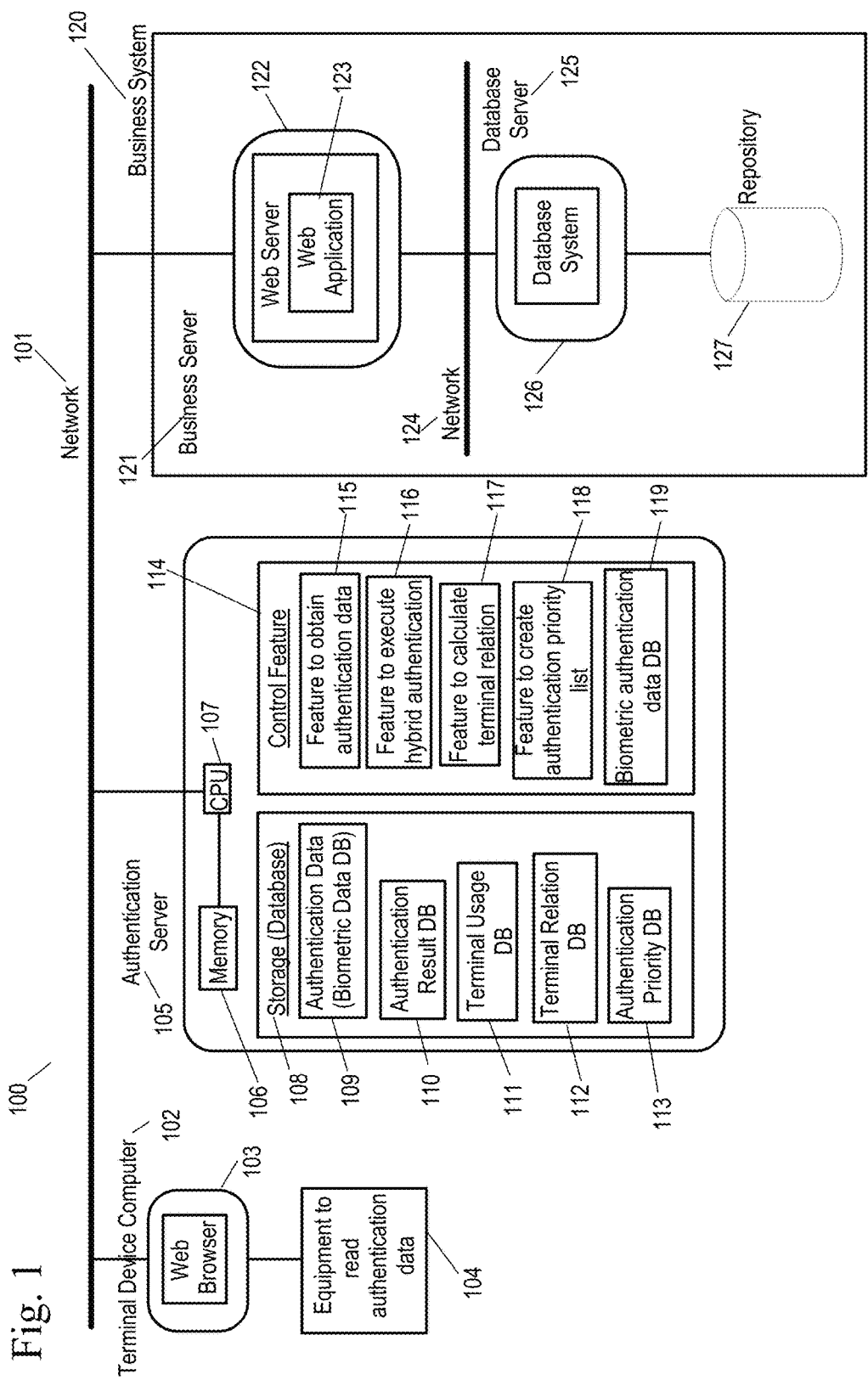
FIG. 1 depicts an exemplary diagram of a possible system configuration of a data processing environment in which illustrative embodiments may be implemented.

The present system proposes new means to improve authentication performance of an authentication system which needs to perform a large quantity of authentications such as biometric authentications using a common account to login to the terminal.

This system relates to an improvement in 1:N authentication where one piece of source data that has been input to be subjected to the authentication has to be compared with multiple or numerous pieces of registered authentication data.

The system achieves performance improvement of authentication by selecting appropriate types of authentication, and also by optimizing authentication sequence.

As an element of optimization in authentication, the system selects authentication type and authentication order based on distribution data of users and terminals.

Furthermore, this system improves the accuracy to obtain the authentication data using "mutual use correlation between terminals" dynamically, as to make dynamic groupings, not from just single terminal data.

In addition, as a method of optimization of authentication sequence, this system proposes modification scheme by focusing on the authentication situation in which operators use multiple terminal simultaneously, while switching sequentially.

Features of the method can improve the 1:N authentication of biometric authentication, respectively. Each of the features listed below independently contribute to performance improvement. Therefore, even if only two elements are used, performance improvement corresponding to each method can be achieved.

These features include, authentication priority list based on dynamic and virtual grouping of terminals used for authentication, resulting in an efficiency improvement of authentication priority sequence in 1:N type authentication, hybrid authentication by switching authentication logic between 1:1 and 1:N authentication, which improves selectivity of authentication logic and masking of pre-logged-in user for authentication priority list in 1:N authentication for efficiency improvement of authentication priority sequence in 1:N type authentication. Features also include obtaining authentication data, in which at the execution of authentication of the user, the authentication data of the user's biometric information is stored, as well as storage of authentication data (ex. biometric data), authentication list, user information, terminal information, terminal grouping data etc.

When considering an embodiment of authentication in a case where a common account is used and multiple users use several common terminals, this system focuses on the maldistribution of authentication usage period and using terminals by each user.

Then, this system uses this maldistribution to improve the authentication performance First, the authentication result on actual environment is recorded, and then the data is analyzed to determine an authentication priority per terminal and usage period, and lastly, store such priority table.

During the authentication process, the system reads out the priority table according to the terminal and usage period. Authentication is preferred with minimum number of authentications using the priority table based on uneven distribution.

However, in actual use, users often use multiple terminals which permitted users to sign in using a common account freely. Therefore, in order to perform optimization according to the usage situation of the terminal, it is effective to group the terminals as a data aggregation target.

In the past, grouping based on the physical location of the terminal and grouping by the organization information to which the terminal belongs have been proposed as grouping methods. However, these methods are grouping methods that do not become a optimized means according to the actual usage form of users.

As a mean for solving the problem of the existing grouping scheme, the present system achieve optimization of authentication sequence which considers not only usage data from single terminal but also that of terminals that have dependency relationship with each other by calculating a dynamic relation between terminals and virtual grouping of the terminals.

Specifically, this system proposes using the movement of users between the terminals to calculate a dependency relationship between the terminals. Thus, regardless of the physical proximity of the terminal, when a single user uses multiple terminals frequently by moving mutually among the respective terminals, the dependency in use of these terminals is high.

In addition, by dynamically calculating the dependency using data in a past fixed period, it is possible to perform authentication optimization according to the usage trend of a terminal user.

Utilizing this dependency, this system uses usage data from all terminals with dynamic dependency and calculates the result with correlation factor as weight factors to obtain a proper authentication sequence.

FIG. 1 depicts an exemplary diagram of a possible system configuration of a data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 100 is a network of computers in which illustrative embodiments may be implemented. Network data processing system 100 contains network 101, which is the medium used to provide communication links between various devices and computers connected together within network data processing system 100. Network 101 may include connections, such as wire, wireless communication links, or fiber optic cables.

In the depicted example, a terminal device computer 102, an authentication server computer 105, a business system 120 including a business server 121 connected through a network 124 to a database server 125 and a repository 127. In other exemplary embodiments, network data processing system 51 may include additional client or device computers, storage devices or repositories, server computers, and other devices not shown.

The terminal device computer 102 may contain a web browser 103 which may include an interface, which may accept commands and data entry from a user. The terminal device computer 102 may also include a processor and associated sensors 104 to read and receive authentication data from a user. The commands may be regarding log in information. The interface can be, for example, a command line interface, a graphical user interface (GUI), a natural user interface (NUI) or a touch user interface (TUI). The terminal device computer 102 includes a set of internal components 800a and a set of external components 900a, further illustrated in FIG. 7.

Figure 7:
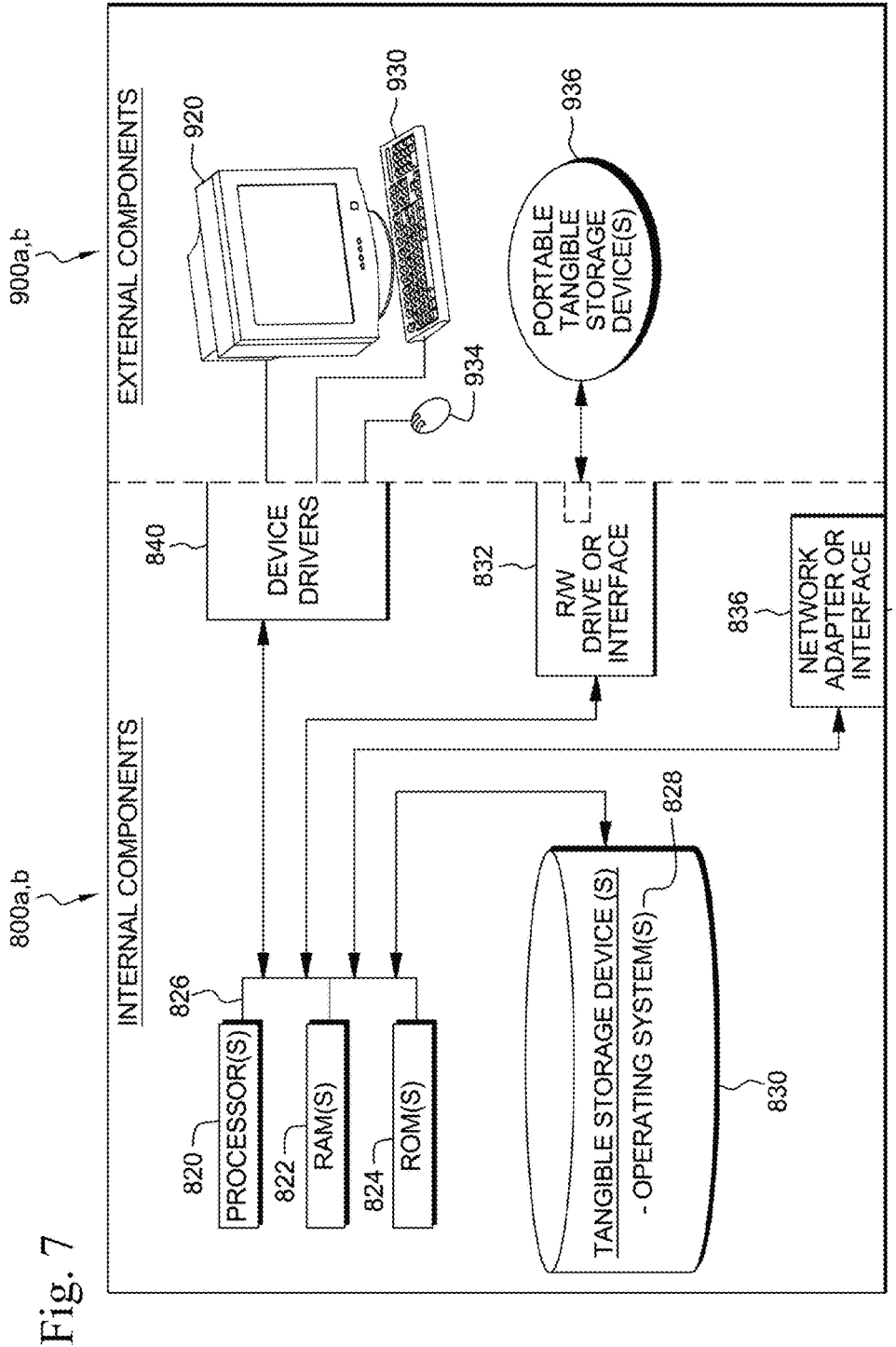
FIG. 7 illustrates internal and external components of a client computer and a server computer in which illustrative embodiments may be implemented.

Authentication server computer 105 includes a set of internal components 800b and a set of external components 900b illustrated in FIG. 7. In the depicted example, server computer 105 provides information, such as boot files, operating system images, and applications to the terminal device computer 102. Authentication server computer 105 can compute the information locally or extract the information from other computers on network 101. The authentication server computer 105 also preferably contains an authentication program 66. The authentication server computer 106 has at least one processor 107 and associated memory 106 connected to a repository 108. The processor 107 executes control features 114. The repository 108 preferably contains authentication data, for example in a biometric data database 109, an authentication result database 110, a terminal usage database 111, a terminal relation database 112 and an authentication priority database 113. The control features 114 include, but are not limited to features to obtain authentication data 115, features to execute hybrid authentication 116, feature to calculate terminal relation 117, features to create an authentication priority list 118, and biometric authentication data database 119.

The business system 120 comprises a business server 121, for example a web server 122 with a web application 123. The business server 125 is connected through an internal network 124 to a database server 125 which includes a database system 126 and an associated repository 127. The web server 122 and the database server 125 includes a set of internal components 800b, and a second of external components 900b illustrated in FIG. 7. The web server 122 and the database server 125 can compute the information locally and extract the information from other computers on network 124 and network 101.

Program code and programs such as authentication program 66 may be stored on at least one of one or more computer-readable tangible storage devices 830 shown in FIG. 7, on at least one of one or more portable computer-readable tangible storage devices 936 as shown in FIG. 7, or in repository 108, or may be downloaded to a terminal device computer 102, authentication server computer 105, or business server computer 121, for use. For example, program code and programs such as authentication program 66 may be stored on at least one of one or more storage devices 830 on authentication server computer 105 and downloaded to terminal device computer 102 over network 101 for use. Alternatively, the authentication server computer 105 can be a web server, and the program code, and programs such as authentication program 66 may be stored on at least one of the one or more storage devices 830 on authentication server computer 105 and accessed by terminal device computer 102. Similarly, the business server is preferably a web server 122. In other exemplary embodiments, the program code, and programs such as authentication program 66 may be stored on at least one of one or more computer-readable storage devices 830 on terminal device computer 102 or distributed between two or more servers.

In the depicted example, network data processing system 100 is the Internet with network 101 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 7 illustrates internal and external components of a terminal device computer 102, authentication server 105, business server computer 121, and database server computer 125 in which illustrative embodiments may be implemented. In FIG. 7, a terminal device computer 102, authentication server 105, business server computer 121, and database server computer 125 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and authentication program 66 are stored on one or more of the computer-readable tangible storage devices 830 for execution by one or more of the processors 820 via one or more of the RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Authentication program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Authentication program 66 can be downloaded to the terminal device computer 102 and the authentication server computer 105 from an external computer via a network (for example, the Internet, a local area network or other, wide area network) and network adapter or interface 836. From the network adapter or interface 836, authentication program 66 is loaded into hard drive 830. Authentication program 66 can be downloaded to the authentication server computer 105 from an external computer via a network (for example, the Internet, a local area network or other, wide area network) and network adapter or interface 836. From the network adapter or interface 836, authentication program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Authentication program 66 can be written in various programming languages including low-level, high-level, object-oriented or non object-oriented languages. Alternatively, the functions of an authentication program 66 can be implemented in whole or in part by computer circuits and other hardware (not shown).

The features of the system are described in greater detail as follows.

Figure 2:
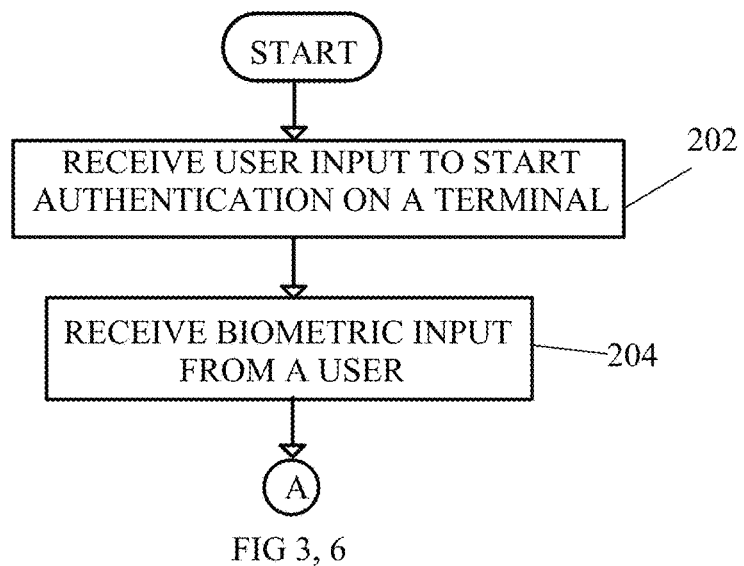
FIG. 2 shows a flowchart of authentication execution.

A. Obtain Authentication Data:

The operation execution timing in the processing of this mechanism is described in the flowchart of FIG. 2, "Execution of authentication".

The system starts with the common terminal logged in to the common account. A user starts an operation which requires authentication—for example, a cashier wishes to scan purchases, or a manager wishes to authorize a price reduction on an item at a register at which a cashier is ringing up a basket of food, etc.

The new user inputs his or her biometric data, as is known to the prior art, for example by placing their thumb on a fingerprint scanner.

Referring to FIG. 2, the terminal device computer 102 receives a user input to start authentication on a terminal (step 202), and the terminal device computer 102 receives biometric input from a user (step 204) and the method ends.

The system then progresses to the hybrid authentication of FIG. 3, below.

In a conventional system, log on information recorded as an authentication log. However, in order to use the authentication execution history data as the base data for improving the authentication efficiency and performance, it is necessary to accumulate subject data by each necessary item to be able to retrieve the authentication history by each authentication time and target terminal. Therefore, it is desirable to store the items described as "user information DB: user information table" in the database as an example of stored data.

B. Execute Hybrid Authentication Data:

In the case of sharing a common account with multiple people, authentication is performed by so-called 1:N authentication in which there are multiple verification targets exists for authentication against inputted data.

To perform 1:N authentication, it is inevitable to load large volume of data from a database, and to transfer such the authentication data. The transfer of data occurs during multiple authentication execution. For this reason, the processing time becomes longer as compared with the 1:1 authentication, in which the input and the verification target are only for a specific log on.

As a solution method of this situation, the system of the present invention increases the authentication performance by focusing maldistribution of authentication as a reproducibility of authentication for the same person on the same terminal.

A method of determining execution of 1:1 authentication is to determine the time (timeout value) since the previous authentication by the same user, or by the input of the different identification information to determine a different user is logging on.

However, if the terminals used for the system are a front-end, customer facing terminal, it is difficult to set simple time out value to determine the terminal usage termination because the counter service cannot be specified simply as a task of using the terminal. In addition, identification input for discriminating users is also difficult with multiple users using the front-end terminal in the usage environment. Therefore, existing 1:1 and 1:N authentication switching methods cannot be applied for this environment.

Therefore, the system of the present invention performs preliminary authentication for making an approximate determination as to whether the user logging onto the terminal is the same user which executed the previous authentication on the terminal.

Authentication speed depends on granularity of authentication implementation. At first, as preliminary authentication, it is determined whether or not it is the same user as which was previously authenticated. After this determination is made, it is determined whether authentication switching should take place. Use of this rough granularity authentication is not a security risk.

If it can be determined that the user is the same user which was authenticated during the previous log on, 1:1 authentication is performed by using the cache of the data to authenticate the previous user.

If it cannot be determined that the previous log on and authentication were for the same user, or if it cannot authenticate the same user in the 1:1 authentication, a sequence for executing normal 1:N authentication is performed. By doing this, this system improves the speed of repetitive authentication by the same user, which is the majority of use cases.

The authentication execution logic itself can utilize the existing authentication logic like biometric authentication method.

The operations which are feature of authentication in the present system consists from the following two parts.

B.1: 1:1 and 1:N Authentication Execution Including Preliminary Authentication

Figure 3:
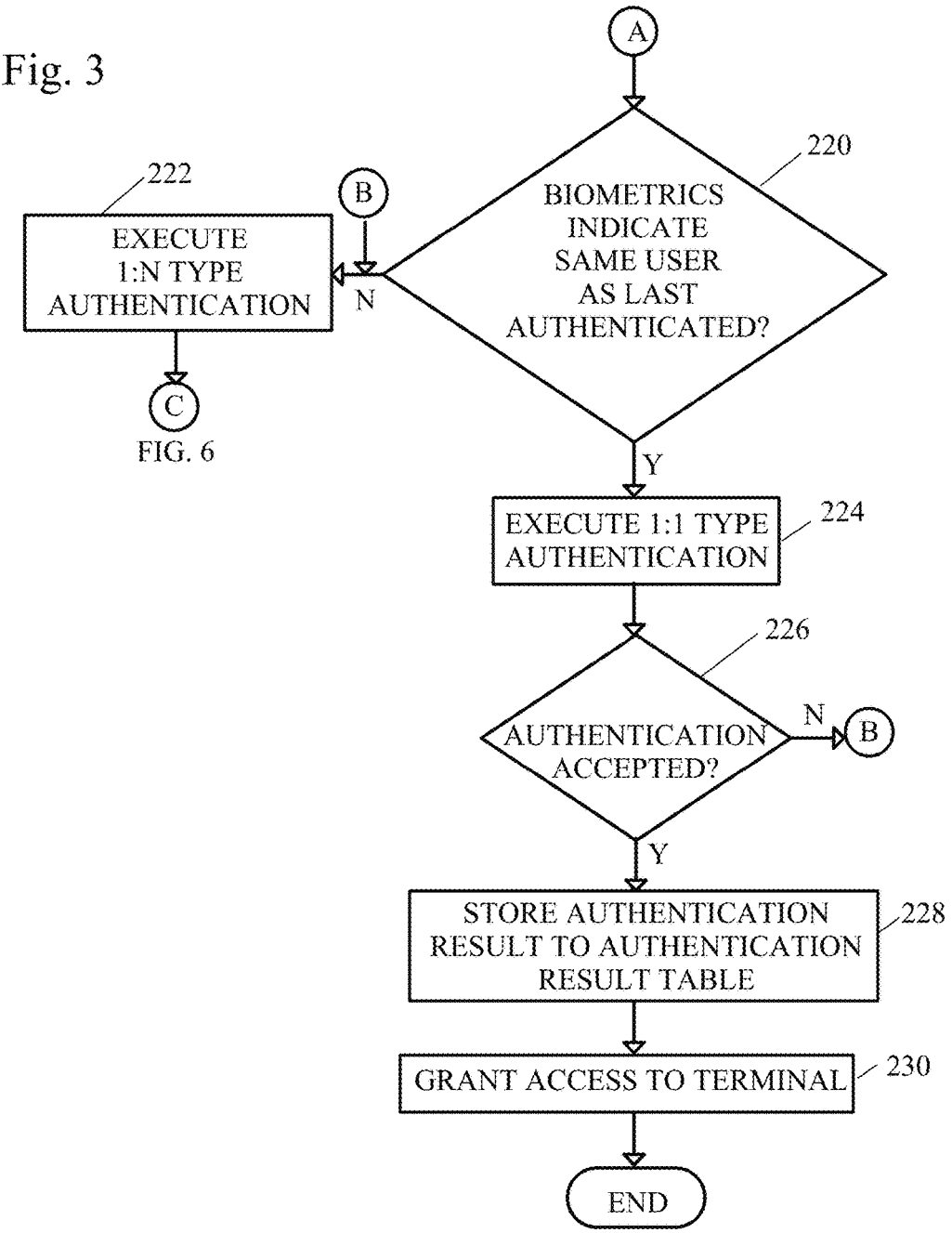
FIG. 3 shows a flowchart of analysis of authentication results.

FIG. 3 shows a flowchart showing the selection of 1:1 or 1:N authentication.

After receiving biometric input from a user and log in information from a user from FIG. 2, the authentication program 66 determines whether the biometrics indicate that the same user as last authenticated by the system is the user logging into the system on the terminal (step 220).

If the user is not the same user previously last authenticated by the system or cannot authenticated the user (step 220), the authentication program 66 executes 1:N type authentication (step 222) and the method continues to FIG. 6 discussed further below.

If the user is the same user previously last authenticated by the system (step 220), the authentication program 66 executes 1:1 type authentication (step 224).

If the authentication information is not accepted for the user (step 226), the method continues to step 222 of executing 1:N type authentication and the method continues to FIG. 6 discussed further below.

If the authentication information is accepted for the user (step 226), the authentication result is stored in an authentication results table (step 228) and the authentication program 66 grants access to the terminal for the user (step 230) and the method ends.

B.1.1: 1:N Authentication Execution Function with Authentication Priority List Mask Function to Eliminate Authentication for Login User at Other Terminal With receiving an authentication request, system performs preliminary authentication which can be executed at high speed with rough granularity by using the entered of the biometric authentication information and the previous authentication information.

This authentication is not the final authentication but the determination of possibility of being the same user as in the previous time.

When it is determined that the possibility of the same user is high, 1:1 authentication is executed using the data of the user who logged in last time. On the other hand, if it is determined that the user is highly different, execution proceeds to 1:N authentication execution.

B.2: 1:N Authentication Execution Function with Authentication Priority List Mask Function to Eliminate Authentication for Login User at Other Terminal For the 1:N authentication, authentication is sequentially executed based on the entered biometric authentication and the authentication priority list.

However, the authentication priority list is a list based on the past authentication status. For this reason, there is a possibility that unnecessary authentication processing may be performed because the user currently logged in at the other terminal is ranked as higher priority in the authentication priority list.

Thus, the read authentication priority list is written out as an authentication priority temporary table. Because this is a temporary table, memory is preferable for storing such a table.

Next, from the authentication result data, the currently logged-in data is searched and then determined user identification is deleted from the temporary authentication table, and the authentication execution is rewritten as to be a meaningful table.

Finally, authentication is executed in the order of the data described in the list of the updated authentication priority temporary table.

C. Calculate Terminal Relations

For 1:N authentication, the validity of the priority list is the most important factor in improving the efficiency of authentication.

In order to increase the accuracy of the list of authentication priorities, it is necessary to enhance the localization of the authentication priority list. So, that is not the priority list in the entire system, but the priority list creation in the group or at the terminal level.

In this case, there is redundancy at the time of using the authentication priority as an adverse effect by increasing the locality. This present system focuses on the fact that reduction of this redundancy contributes to high speed.

Specifically, in the case of an environment using a shared terminal, the same user uses multiple terminals. As a result, registration of the same user in the priority lists is a situation that can normally occur in this type of use-case.

On the other hand, from the viewpoint of authentication, there is no usage mode in which the same user authenticates and logs in to multiple terminals at the same time.

At the time of authentication execution, when reading the authentication priority, authentication of the user logged in at the other terminal cannot occur. So, the system of the present invention improves the authentication performance by excluding the user who is logging in at the other terminal from the authentication priority list based on this premise.

However, removal (masking) from the list changes dynamically according to the user usage situation at the timing when the authentication request occurs. Thus, the system of the present invention copies the authentication priority list as a temporary table to allow temporal change to this table, and then executes authentication using this temporal authentication priority list to make authentication according to the usage condition.

The functions of this element include, authentication data acquisition function, terminal relation calculation function and terminal relation data storage function.

Example of Terminal Grouping Management Scheme

Below is an example of operation of the terminal grouping management scheme. However, the method of calculating the terminal relevancy (relation) is just an example, and another method of calculating the terminal relevance could be used based on the authentication record of each terminals.

For the target terminal, data on which terminal the user who executed the next authentication is collected. A function aggregates the collected results for a certain period and calculates the terminal relevance index of each terminal towards to other terminals. The calculation is a ratio (%) of which terminal the user who logged in the subject terminal logged in to the next terminal. This calculation is stored in the "terminal relation DB: terminal relation table".

The relevance index (%) for the terminal (Y) of the terminal (X)=Number of times of logging in to the terminal Y after logging in the terminal X within the targeting period/the number of logins to terminal X within the specific period.

In an environment where customer's tasks are carried out while sharing multiple side by side common terminals, the user carries out their business process with the empty terminal without being conscious of the unique terminal.

Under such circumstances, the creation of an authentication priority list only from single terminal usage data does not result in list creation that reflects actual usage.

Figure 4A:
FIGS. 4A and 4B show an example of relevance between terminals.
Figure 4B:
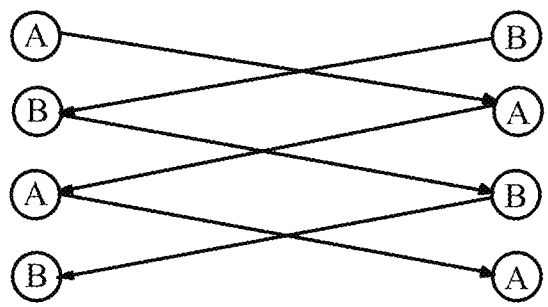

Therefore, the system creates the priority list using relevant terminal data with weighted factor after determination of dynamic relation factor between terminals. FIGS. 4A and 4B show terminals 1 and 2, in which the circled "A" elements represent authentication of user "A", and the circled "B" elements represent authentication of user "B".

FIG. 4A shows a case where the relevance between the terminal 1 and the terminal 2 is zero regardless of the physical location of the terminal.

FIG. 4B shows a case with the relevance between the terminal 1 and the terminal 2 is quite high regardless of the physical location.

D. Create Authentication Priority List

FIG. 5 shows a flowchart of a method of relation analysis and priority list creation. The process of FIG. 5 can be performed daily or weekly, and does not need to be performed after each authorization, although if processor resources permit, it could be performed after each authorization.

In a first step, the authentication program 66 calculates a terminal usage ratio per time slot based on the authentication result table and stores the terminal usage ratio per time slot to the terminal usage ration table (step 280).

The authentication program 66 calculates a terminal relation and stores the terminal relation to the terminal relation table (step 282).

The authentication program 66 then calculates the authentication priority based on the terminal relation, terminal usage ration table and authentication result and stores the authentication priority to the authentication priority table (step 284) and the method ends.

An authentication priority list is created for each corresponding terminal. The authentication priority list of the time slot X of the terminal (W) is calculated by the following procedure:

D.1: Estimation of Authentication Usage Ratio Per Target Time Slot of the Corresponding Terminal The user (Y) assumed authentication use ratio in the time slot (X) of the corresponding terminal (W).

$$=\Sigma \dot{X} \cdot (\text{The relevance index (\%) for the target terminal } (Z) \text{ of the corresponding terminal } (W) \times \text{(Percentage of usage (\%) in the time slot } (X) \text{ of the target terminal } (Z))$$

$\dot{X}$ It is carried out for both all target terminals and all users.

D.2: Creation of Priority List

The priority of the corresponding terminal (W) in the time slot (X) is created as priority list by sorting in in descending order toward to the user (Y) assumed authentication use ratio in the time slot (X) of the corresponding terminal (W).

E. Storage and Database

The following several tables show examples of tables retained in storage by each mechanism in this system. It will be understood that actual details in a system will vary depending on the actual implementation.

TABLE E.1

User Information Database - User Information Table

| Common Account ID | Biometric Data | | | | |
|---|---|---|---|---|---|
| | Data File A | User Name | User | ... Data File N | User Name User |
| 001 | /xxx/123456_1 | John Doe | A | ... /xxx/123456_N | Bill Clark B |
| 002 | /xxx/234567_1 | Bill Roe | C | ... /xxx/123456_1 | John Doe A |
| ... | ... | ... | | ... ... | ... |
| 00n | /xxx3452452_1 | Jane Doe | D | ... /xxx/3452452_N | Bob Jones XX |

Note in this example the distinction between "Users", who are people with biometric data associated with them (identified for the purposes of example by letters A-XX), and "Common Account IDs", which are system identifiers which are used to sign in to a terminal (identified for purposes of example by numbers 001-00n).

Each Common Account ID might be used by a number of different users, therefore, there are multiple users which can be associated with one Common Account ID, each User having his or her own authentication (biometric) data. The User Information Table lists the various users associated with each User ID, and the biometric data which is used to identify that User.

In the system, one Common Account ID may only log into a single terminal at a time, while one User can be logged into a number of terminals simultaneously—for example, in the instance where a master cashier might need to move from one register to another during the course of a shift.

TABLE E.2

Authentication Result Database - Authentication Results Table

| Process No. | Date | Time | Terminal | IP Addr | Common Account ID | User |
|---|---|---|---|---|---|---|
| 201511230001 | 2016 Nov. 30 | 10:11:12 | 1 | 192.10.1.1 | 001 | B |
| 201511230002 | 2016 Nov. 30 | 10:11:15 | 1 | 192.10.1.1 | 001 | C |
| 201511230002 | 2016 Nov. 30 | 10:11:15 | 1 | 192.10.1.1 | 001 | A |
| ... | ... | ... | ... | ... | ... | ... |
| 20151123000x | 2016 Nov. 30 | 10:15:33 | 1 | 192.10.1.1 | 002 | C |

In the examples, the identification of individual terminals is given by a simple number 1-x, each at an IP address, but it will be understood that the terminal may be alternatively identified by the IP address itself, an alphanumeric identifier ("Shoe Department") or a host name or ID ("Ithaca Store Register 1").

TABLE E.3

Terminal Usage Status DB: Terminal Usage Ratio Per Time Slot

| Date | Time Slot | Terminal | User | | | | |
|---|---|---|---|---|---|---|---|
| | | | A | B | C | ... | XX |
| 2016 Nov. 29 | 0900-1000 | 1 | 15% | 35% | 25% | ... | 0% |
| 2016 Nov. 29 | 0900-1000 | 2 | 50% | 0% | 20% | ... | 0% |
| ... | ... | ... | ... | ... | ... | ... | ... |
| 2016 Nov. 29 | 0900-1000 | x | 0% | 0% | 0% | ... | 100% |
| ... | ... | ... | ... | ... | ... | ... | ... |
| 2016 Nov. 29 | 1700-1800 | 1 | 50% | 25% | 0% | ... | 0% |
| 2016 Nov. 29 | 1700-1800 | 2 | 0% | 40% | 30% | ... | 0% |
| ... | ... | ... | ... | ... | ... | ... | ... |
| 2016 Nov. 29 | 1700-1800 | x | 0% | 0% | 20% | ... | 60% |

Note that in the example of Table E.3, the result shows login usage ratio is 15% for User A and 35% for User B and 25% for User C at a target period of 9:00 thru 10:00 on a given day.

This information can be used to set up the Authentication Priority Table—those Users who are most likely to be using a terminal will be allocated a higher priority for the terminal within a given time slot than those who are less likely (or unlikely) to be using that terminal during that time slot. See table E.5, below, for the Authentication Priority Table.

TABLE E.4

| Terminal Relation Database - Terminal Relation Table | | | | | |
|---|---|---|---|---|---|
| | | Terminal (Target for Relation) | | | |
| | | 1 | 2 | ... | x |
| Terminal (Origin) | 1 | 70% | 20% | ... | 4% |
| | 2 | 30% | 50% | ... | 13% |
| | ... | ... | ... | ... | ... |
| | x | 5% | 14% | ... | 70% |

In table E.4, the Relation Ratio of Terminal 1 to Terminal 2 is 20%. This ratio means 20% of the user logged on to the terminal at Terminal 1 then logged on to Terminal 2 the next time they logged on.

The terminal relations from this table can be combined with the data from the terminal usage table E.3 to determine the overall priority, which will be stored in table E.5, below.

This table provides information about those terminals which are used by among some specific groups in which users change terminals frequently during a given time period. Priority usage calculates not only single terminal usage, but also using multiple terminals usage. And in this situation, terminal relation data from table E.4 will be used.

Terminal usage data for Authentication Priority with considering usages on multiple terminal and terminals usage relation will be obtained thru following formula, for example:

Estimated terminal usage for terminal (W) in timeslot (T)=

$$\sum_{i=1}^{x}$$

(Terminal Relation between terminal (W) and terminal (i) from Table E.4
xx Terminal Usage Ratio for Terminal (i) in time slot (T) from Table E.3)

Wherein the summation is applied for all terminals, denominated as Terminal 1 through Terminal x.

TABLE E.5

| Authentication Priority Database - Authentication Priority Table | | | | | | | |
|---|---|---|---|---|---|---|---|
| | | | Authentication Priority | | | | |
| Terminal | Date | Time Slot | Priority 1 | Priority 2 | Priority 3 | ... | Priority N |
| 1 | 2016 Nov. 30 | 0900-1000 | User B | User C | User A | ... | User G |
| 2 | 2016 Nov. 30 | 1000-1100 | User B | User A | User Q | ... | User XX |
| ... | ... | ... | ... | ... | ... | ... | ... |
| x | 2016 Nov. 30 | 2300-2400 | User XX | User Q | User E | ... | User FF |

In table E.5, the example shows authentication priority for Terminal 1 at timeslot 9:00 thru 10:00 on Nov. 30, 2016 is User B (based on his 35% usage of this terminal at the same time slot on the previous day), then User C (25%), then User A (15%) . . . finally User XX (who didn't use that terminal at all the day before).

Flowchart of the Method of 1:N Authentication

Figure 6:
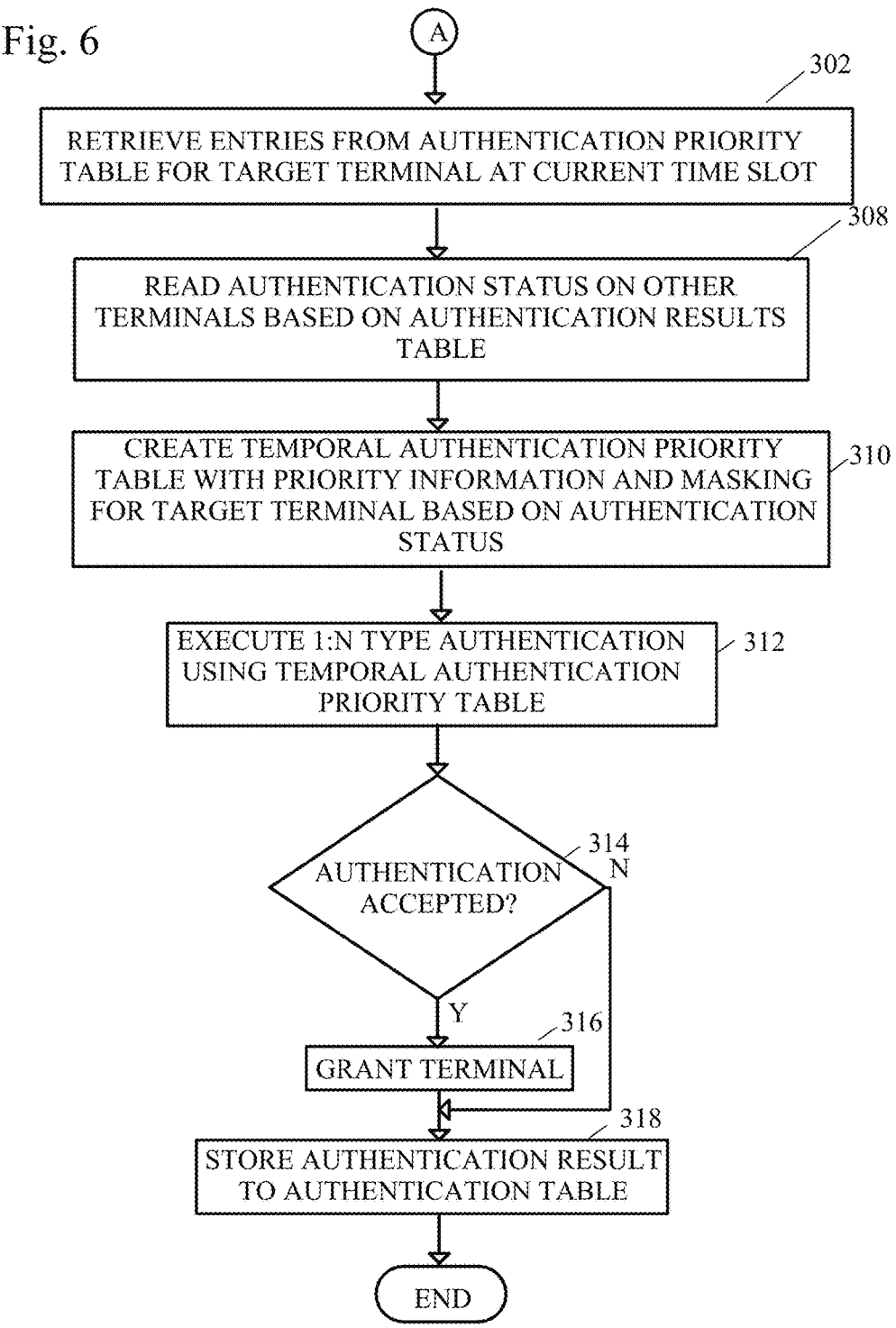
FIG. 6 shows a flowchart of execution of 1:N type authentication.

FIG. 6 shows a flowchart of the method of 1:N authentication.

In this example, Common Account ID 001 represents all of the users in a single group—say, the employees of the shoe department in a department store. The shoe department might have a number of cash register terminals, denominated as Terminal 1 to Terminal x, and when the store is opened, all of the terminals in the departments are opened by Common Account ID 001. Each of the twenty-six employees in the department is denominated by a letter, for example User A . . . User Z, and each of the twenty-six employees will have his or her own biometric data for authentication purposes. All of the twenty-six employees are not likely to be in the store at any given time slot, as each has his or her own schedule, but when they are there they may need to authenticate (log in) at any of the terminals 1-x.

Now, at 0930 in the morning on Nov. 30, 2017, a user (User M) is attempting to authenticate at a target terminal, for the purposes of this example, Terminal 1. The user may have previously logged on to one or more other terminals. The user enters his authentication data (for example, puts his thumb on a reader or enters his code at the register keypad).

In the prior art, the system would then have to perform the authentication process for each of the users (Users A-Z) in the group (Common Account ID 1, the shoe department), until it found a match for the biometrics for the new user. If the biometric data were arranged sequentially by user name, for example, the system would have to go through each of the users from User A through User L before finding a match for User M. Thus the system would have to go through the authentication process twelve times. Clearly, in larger groups this could potentially take a significant amount of time.

This situation can be improved by prioritizing the users who might be expected to log in at a specific terminal at a specific time slot. This can be stored in an Authentication Priority Table. The Authentication Priority Table has the following information:

TABLE F.1

| Authentication Priority Table | | | | | | | |
|---|---|---|---|---|---|---|---|
| | | | Authentication Priority | | | | |
| Terminal | Date | Time Slot | Priority 1 | Priority 2 | ... | Priority n | ... | Priority x |
| 1 | 2016 Nov. 30 | 0900-1000 | User B | User C | ... | User M | ... | User Q |
| 2 | 2016 Nov. 30 | 0900-1000 | User A | User C | ... | User D | ... | User X |
| ... | ... | ... | ... | ... | ... | ... | ... |
| x | 2016 Nov. 30 | 0900-1000 | User D | User B | ... | User Q | ... | User F |

From step 222 of FIG. 3, when User M attempts to log in at Terminal 1 for Common Account ID 001, the authentication program 66 retrieves entries from the authentication priority table for the target terminal at the current time slot (step 302).

The information extracted from the table for the target terminal would be, as follows:

TABLE F.1(a)

Authentication Priority Table for Target Terminal

| Terminal | Date | Time Slot | Authentication Priority | | | |
|---|---|---|---|---|---|---|
| | | | Priority 1 | Priority 2 ... | Priority n ... | Priority x |
| 1 | 2016 Nov. 30 | 0900-1000 | User B | User C ... | User M ... | User Q |

This indicates that User M is on the list at Priority n for Terminal 1 in this time slot. Therefore, if the method simply uses this priority table, the system would only have to review (n−1) sets of authentication data before reaching User M's data. Assuming that only a relatively small sub-set of users is likely to have priority for this terminal at this time (i.e. (n−1)<12), this would improve the log-in time for User M.

In the current method, however, the authentication process is improved, as discussed below. The authentication program 66 reads the authentication status on the other terminals from the authentication results table (step 308).

TABLE F.2

Authentication Results Table

| Process No. | Date | Time | Terminal | User |
|---|---|---|---|---|
| 201511230001 | 2016 Nov. 30 | 09:11:12 | Terminal 3 | User A |
| 201511230002 | 2016 Nov. 30 | 09:11:15 | Terminal 11 | User B |
| 201511230003 | 2016 Nov. 30 | 09:11:17 | Terminal 12 | User C |
| 201511230004 | 2016 Nov. 30 | 09:13:20 | Terminal 8 | User G |
| 201511230005 | 2016 Nov. 30 | 09:20:23 | Terminal 11 | User D |
| 201511230006 | 2016 Nov. 30 | 09:25:29 | Terminal 11 | User N |
| ... | ... | ... | ... | ... |

Thus, the authentication program notes that User A is currently logged in on Terminal 3, Users B, D and N are currently logged in at Terminal 11, User C is currently logged in at Terminal 12, and User G is logged in at Terminal 8, as noted above. Other users are logged in at other terminals.

The authentication status read in step 308 is then used to create a Temporal Authentication Priority Table by adding priority information and mask status as noted below (step 310). For each priority, additional data is added to indicate mask status. Because the mask status has two conditions, the example defines the status states as "true" meaning "masked" and "false" meaning "unmasked". It will be understood that any other code could be used for this function, such as a simple 0 or 1 binary number, etc.

Each user who is already logged in at another terminal is masked—that is, assigned a mask value of "true" in this example. Looking only at the masking for the target terminal, the table would be as follows:

TABLE F.3

Temporal Authentication Priority Table

| Terminal | ... | Priority 1 | Mask for 1 | Priority 2 | Mask for 2 ... | Priority n | Mask for n ... |
|---|---|---|---|---|---|---|---|
| 1 | ... | User B | True | User C | True ... | User M | False ... |

Thus, in this example, the first two priority entries are masked ("true") because these users are authenticated elsewhere. Assume that the other users prioritized as priority 3 through (n−1) are also logged in, and are thus also masked out.

Note that if a user logs out of a terminal, the masking for that user would be removed wherever it appears on the Temporal Authentication Priority Table.

The "Authentication Priority Table" differs from the "Temporal Authentication Priority Table" in the following ways:

Status change: The Authentication Priority Table has a static status among measurement interval for authentication operation statistics, hourly, daily or weekly. On the other hand, Temporal Authentication Priority Table can change its data and masked status dynamically according to the authenticate operation.

Storage Location: Because the Authentication Priority Table has a static nature, these tables are preferably stored in a repository or storage medium. On the other hand, the Temporal Authentication Priority Table must be capable of changing its masked status timely and quickly, so these tables should be stored in processor memory.

Creating the table: The Temporal Authentication Priority Table is created by loading the Authentication Priority Table from storage into memory, modified as noted above.

The authentication program 66 then executes 1:N type authentication using the temporal authentication priority table (step 312).

When User M attempts to authenticate at terminal 1, therefore, the system does not attempt authentication with User B's information or User C's information, or any of the other users in priorities 3–(n−1). These users are skipped ("masked"), and the system goes directly to priority n—User M—who passes authentication on the first try.

This improves the performance of the system, since authentication does not need to be performed against the biometric data for any User who is already logged on elsewhere (their entries are masked), and the remaining users are ranked by their priority (likelihood that the user might log in to this terminal at this time) so that the system can perform the authentication first for those users most likely to be trying to authenticate.

Also note that if User M were logged on at another terminal, he, too, would be masked out—the mask for priority n would be "true". In this case, User M would be unable to authenticate at terminal 1. This would enforce security by forcing a user to log off at whatever terminal they are using before logging in anywhere else. Alternatively, the system could be set up to automatically log off a user after a period of inactivity, so that the unmasking would happen automatically, allowing a user to move from terminal to terminal freely as long as they allow a determined time between logins.

If the authentication is accepted by the terminal (step 314), the access to the terminal is granted (step 316), the authentication result is stored to the authentication table (step 318) and the method ends.

If the authentication is not accepted by the terminal (step 314), the authentication result is stored to the authentication table (step 318), a message is sent to the terminal indicating that the authentication was not accepted (step 320), and the method ends.

G. Main Elements of the System:

Element 1: Hybrid Authentication Processing Execution Mechanism

In response to the user's authentication request, authentication is performed by authenticating the entered biometric information of the target user with stored authentication reference biometric data and stored authentication reference data of the biometric information. This system implements 1:1 type authentication and also 1:N authentication.

1:N type authentication process is performed according to the relevant authentication priority by terminals.

Also, In this 1:N type authentication, the Common Account ID being logged in by another terminal is confirmed, the common account being logged in by the other terminal is masked from the authentication priority list to exclude it from the authentication targets.

Element 2: Terminal Relevance Calculation Feature

Calculation of dynamic grouping of terminals, that is, virtual dependency relationships between terminals, based on the authentication result data in the user terminal is stored.

Element 3: Feature to Create Authentication Priority List

Creates and saves an authentication priority list for each pre-defined condition, such as time, based on the authentication record at each terminal and the dependency relationship data between the terminals.

H. Other Elements

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of authentication of users at multiple terminals comprising the steps of:
   a) a computer receiving user input to starting authentication on a target terminal comprising biometric input from the user;
   b) the computer determining whether the biometric input received from the user indicates a same user is starting authentication on the target terminal as last authenticated by the computer for the target terminal;
   c) if the user is the same user that was last authenticated by the computer for the target terminal, the computer executing 1:1 type authentication of the user;
   d) if the user is not the same user that was last authenticated by the computer for the target terminal, the computer:
      i) retrieving entries from an authentication priority table for the target terminal at a current time slot;
      ii) reading an authentication status on terminals other than the target terminal based on an authentication results table;
      iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal;
      iv) executing 1:N type authentication of the user using the temporal authentication table;
      v) determining whether the 1:N type authentication is accepted; and
      vi) if the 1:N type authentication is accepted, the computer granting the user access to the target terminal and storing the authentication result in the authentication results table;
   wherein authentication priority for the authentication priority table is determined by the steps comprising:
      the computer calculating a terminal usage ratio per time slot based on the authentication result table and storing as a terminal usage ratio table;
      the computer calculating a terminal relation and storing as a terminal relation table; and
      the computer calculating the authentication priority based on the terminal relation table, the terminal usage ratio table and the authentication result and storing the authentication priority to the authentication priority table.

2. The method of claim 1, wherein the terminal usage ratio per time slot is based on a relevance index of the number of times a user logged into the terminal within a time slot for the terminal and the percentage of usage of the terminal in a time slot.

3. The method of claim 1, wherein the authentication priority is a likelihood of a user is using the target terminal for a given time slot.

4. The method of claim 1, wherein if the 1:1 authentication is accepted, storing the authentication result to the authentication result table and granting access to the target terminal.

5. The method of claim 1, wherein if the 1:1 authentication is denied, returning to step d) i) of retrieving entries from an authentication priority table for the target terminal at a current time slot.

6. The method of claim 1, wherein the authentication priority list is based on past authentication status of users relative to a terminal.

7. The method of claim 1, wherein the temporal authentication table is stored in memory and the authentication priority table is stored in a repository.

8. A computer program product for authentication of users at multiple terminals, using a computer comprising at least one processor, one or more memories, one or more computer readable storage media, the computer program product comprising a computer readable storage medium having program instructions embodied therewith, the program instructions executable by the computer to perform a method comprising:
   a) receiving, by the computer, user input to starting authentication on a target terminal comprising biometric input from the user;
   b) determining, by the computer, whether the biometric input received from the user indicates a same user is starting authentication on the target terminal as last authenticated by the computer for the target terminal;
   c) if the user is the same user that was last authenticated by the computer for the target terminal, executing, by the computer, 1:1 type authentication of the user;
   d) if the user is not the same user that was last authenticated by the computer for the target terminal, the computer:
      i) retrieving entries from an authentication priority table for the target terminal at a current time slot;
      ii) reading an authentication status on terminals other than the target terminal based on an authentication results table;
      iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal;
      iv) executing 1:N type authentication of the user using the temporal authentication table;
      v) determining whether the 1:N type authentication is accepted; and
      vi) if the 1:N type authentication is accepted, the computer granting the user access to the target terminal and storing the authentication result in the authentication results table;

wherein authentication priority for the authentication priority table is determined by the program instructions comprising:

calculating, by the computer, a terminal usage ratio per time slot based on the authentication result table and storing as a terminal usage ratio table;

calculating, by the computer, a terminal relation and storing as a terminal relation table; and calculating, by the computer, the authentication priority based on the terminal relation table, the terminal usage ratio table and the authentication result and storing the authentication priority to the authentication priority table.

9. The computer program product of claim 8, wherein the terminal usage ratio per time slot is based on a relevance index of the number of times a user logged into the terminal within a time slot for the terminal and the percentage of usage of the terminal in a time slot.

10. The computer program product of claim 8, wherein the authentication priority is a likelihood of a user is using the target terminal for a given time slot.

11. The computer program product of claim 8, wherein if the 1:1 authentication is accepted, storing the authentication result to the authentication result table and granting access to the target terminal.

12. The computer program product of claim 8, wherein if the 1:1 authentication is denied, returning to step d) i) of retrieving entries from an authentication priority table for the target terminal at a current time slot.

13. The computer program product of claim 8, wherein the authentication priority list is based on past authentication status of users relative to a terminal.

14. The computer program product of claim 8, wherein the temporal authentication table is stored in memory and the authentication priority table is stored in a repository.

15. A computer system for authentication of users at multiple terminals comprising a computer comprising at least one processor, one or more memories, one or more computer readable storage media having program instructions executable by the computer to perform the program instructions comprising:

a) receiving, by the computer, user input to starting authentication on a target terminal comprising biometric input from the user;

b) determining, by the computer, whether the biometric input received from the user indicates a same user is starting authentication on the target terminal as last authenticated by the computer for the target terminal;

c) if the user is the same user that was last authenticated by the computer for the target terminal, executing, by the computer, 1:1 type authentication of the user;

d) if the user is not the same user that was last authenticated by the computer for the target terminal, the computer:

i) retrieving entries from an authentication priority table for the target terminal at a current time slot;

ii) reading an authentication status on terminals other than the target terminal based on an authentication results table;

iii) creating a temporal authentication priority table comprising: priority information for users for each terminal, time, terminal information, and masking of users at terminals based on the authentication results table, wherein the masking is of each user who is already logged in at terminals and is not the user currently the user starting the authentication at the target terminal;

iv) executing 1:N type authentication of the user using the temporal authentication table;

v) determining whether the 1:N type authentication is accepted; and vi) if the 1:N type authentication is accepted, the computer granting the user access to the target terminal and storing the authentication result in the authentication results table;

wherein authentication priority for the authentication priority table is determined by the program instructions comprising:

calculating, by the computer, a terminal usage ratio per time slot based on the authentication result table and storing as a terminal usage ratio table;

calculating, by the computer, a terminal relation and storing as a terminal relation table; and calculating, by the computer, the authentication priority based on the terminal relation table, the terminal usage ratio table and the authentication result and storing the authentication priority to the authentication priority table.

16. The computer system of claim 15, wherein the terminal usage ratio per time slot is based on a relevance index of the number of times a user logged into the terminal within a time slot for the terminal and the percentage of usage of the terminal in a time slot.

17. The computer system of claim 15, wherein the authentication priority is a likelihood of a user is using the target terminal for a given time slot.

18. The computer system of claim 15, wherein if the 1:1 authentication is accepted, storing the authentication result to the authentication result table and granting access to the target terminal.

19. The computer system of claim 15, wherein the authentication priority list is based on past authentication status of users relative to a terminal.

20. The computer system of claim 15, wherein the temporal authentication table is stored in memory and the authentication priority table is stored in a repository.

21. The computer system of claim 15, wherein if the 1:1 authentication is denied, returning to step d) i) of retrieving entries from an authentication priority table for the target terminal at a current time slot.

* * * * *